(12) United States Patent
Lundahl

(10) Patent No.: US 10,791,853 B2
(45) Date of Patent: Oct. 6, 2020

(54) REUSABLE BAG SYSTEM AND METHOD

(71) Applicant: Chad Lundahl, Woodbury, MN (US)

(72) Inventor: Chad Lundahl, Woodbury, MN (US)

( * ) Notice: Subject to any disclaimer, the term of this patent is extended or adjusted under 35 U.S.C. 154(b) by 0 days.

(21) Appl. No.: 15/969,677

(22) Filed: May 2, 2018

(65) Prior Publication Data

US 2019/0335925 A1    Nov. 7, 2019

(51) Int. Cl.
| | | |
|---|---|---|
| *A47F 10/02* | (2006.01) | |
| *A45C 3/04* | (2006.01) | |
| *G06Q 10/08* | (2012.01) | |
| *G05B 15/02* | (2006.01) | |
| *E05B 73/00* | (2006.01) | |
| *A47F 10/00* | (2006.01) | |

(52) U.S. Cl.
CPC ............... *A47F 10/02* (2013.01); *A45C 3/04* (2013.01); *G05B 15/02* (2013.01); *G06Q 10/087* (2013.01); *A47F 2010/005* (2013.01); *A47F 2010/025* (2013.01); *E05B 73/00* (2013.01)

(58) Field of Classification Search
CPC ............... A47F 10/02; A47F 2010/025; A47F 2010/005; G06Q 10/087; G05B 15/02; E05B 73/00; A45C 3/04
USPC .................................................. 700/231–244
See application file for complete search history.

(56) References Cited

U.S. PATENT DOCUMENTS

| | | | | |
|---|---|---|---|---|
| 3,119,484 A * | 1/1964 | Davis | ..................... | G07F 11/045 194/255 |
| 3,749,218 A * | 7/1973 | Verbeke | ..................... | B64C 3/38 194/247 |
| 4,715,489 A * | 12/1987 | Verrelli | ................ | G07F 11/045 194/256 |
| 4,912,906 A * | 4/1990 | Toner | ..................... | B65B 5/022 186/59 |
| 5,313,766 A * | 5/1994 | Rimondi | ............... | B29C 65/229 53/245 |
| 5,473,865 A * | 12/1995 | Tanaka | ..................... | B65B 1/32 53/502 |
| 6,006,495 A * | 12/1999 | Varichon | ................ | A47F 9/043 271/10.06 |
| 7,248,164 B2 * | 7/2007 | Regard | ................ | G06Q 20/203 340/568.5 |
| 7,689,481 B2 * | 3/2010 | Seagle | ................... | B65D 19/38 150/154 |
| 7,886,971 B2 * | 2/2011 | Cassady | ................ | G06Q 10/06 235/383 |
| 8,448,857 B2 * | 5/2013 | Davis | ................ | G06Q 30/0603 235/383 |
| 8,457,785 B2 * | 6/2013 | Tam | ........................ | A47F 9/043 700/232 |
| 2004/0026134 A1 * | 2/2004 | Waggoner | ............. | G01G 19/52 177/160 |
| 2006/0207995 A1 * | 9/2006 | Erwin | .................. | G07F 11/045 221/211 |
| 2007/0226142 A1 * | 9/2007 | Hanna | ................. | G06Q 20/105 705/41 |

(Continued)

*Primary Examiner* — Michael Collins
(74) *Attorney, Agent, or Firm* — Cohen IP Law Group, P.C.; Michael N. Cohen

(57) ABSTRACT

A system and method for providing reusable bags is disclosed. The system may include a reusable bag deployment station that allows users to receive the reusable bags and to return the reusable bags. The system may track the usage of the reusable bags.

20 Claims, 8 Drawing Sheets

(56) References Cited

U.S. PATENT DOCUMENTS

| | | | |
|---|---|---|---|
| 2007/0251990 A1* | 11/2007 | LeNorman | G07F 17/20 235/375 |
| 2010/0318440 A1* | 12/2010 | Coveley | G01G 19/40 705/26.1 |
| 2011/0089234 A1* | 4/2011 | Iida | G07G 1/0054 235/383 |
| 2012/0066156 A1* | 3/2012 | Pryor | G06Q 20/20 705/500 |
| 2014/0297027 A1* | 10/2014 | Tylenda | G16H 40/20 700/237 |
| 2015/0208834 A1* | 7/2015 | Ruddis | A47F 13/085 211/7 |
| 2017/0362071 A1* | 12/2017 | Showalter | B01F 15/00837 |
| 2018/0260802 A1* | 9/2018 | Humphrys | G06Q 20/24 |

* cited by examiner

REUSABLE BAG SYSTEM AND METHOD

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

The current invention generally relates to reusable bags, and in particular to a system and method for manufacturing, deploying, tracking, receiving, controlling, refurbishing, maintaining, redeploying and repurposing reusable bags. The current invention also relates to user data collection and data analysis.

BACKGROUND OF THE INVENTION

It is a well-known fact that modern society is facing a waste management crisis, and that the amount of waste produced on a daily basis has become overwhelming.

Accordingly, efforts to reduce the amount of waste produced are extremely important. For example, programs that recycle bottles and cans have been very successful.

However, there are many products that are used for a very brief amount of time and then put into the trash. In one example, bags provided by grocery stores and other types of retail stores are typically used to carry the purchased items home and are then subsequently thrown into the trash. This creates a huge amount of waste that may be prevented by the use of reusable bags.

Currently, reusable bags may be purchased for use. Once purchased, the user may typically bring the reusable bag(s) with them to the store to use the reusable bags to carry their purchases home. However, it is easy to lose track of the purchased reusable bags and/or to forget them when going to the market or store. Accordingly, the usage of such reusable bags is very limited. Also, if one may forget their reusable bag, he/she may be tempted to purchase another reusable bag to use, and may thereby accumulate an excess number of reusable bags.

In addition, the purchased reusable bags may become dirty or damaged or otherwise unfit for continued use, at which time the user must purchase new reusable bags.

Accordingly, there is a need for a system that may provide reusable bags for use at the point of the sale of the goods to be carried. There is also a need for a system that may issue the reusable bags, track the usage of the reusable bags, and receive the reusable bags back from the users to refurbish and redeploy. For example, the reusable bags may be sterilized or otherwise cleaned before being redeployed. This may provide healthy hygiene for the customers of the bags.

It is desirable, and an object of this invention, to provide a system that will provide a turn-key solution for the deployment, tracking, refurbishment and redeployment of reusable bags.

In addition, advertising and marketing messages may be placed on such reusable bags. Accordingly, it is desirable, and an object of this invention, to deploy and track advertising and marketing messages that may be included with the reusable bags.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
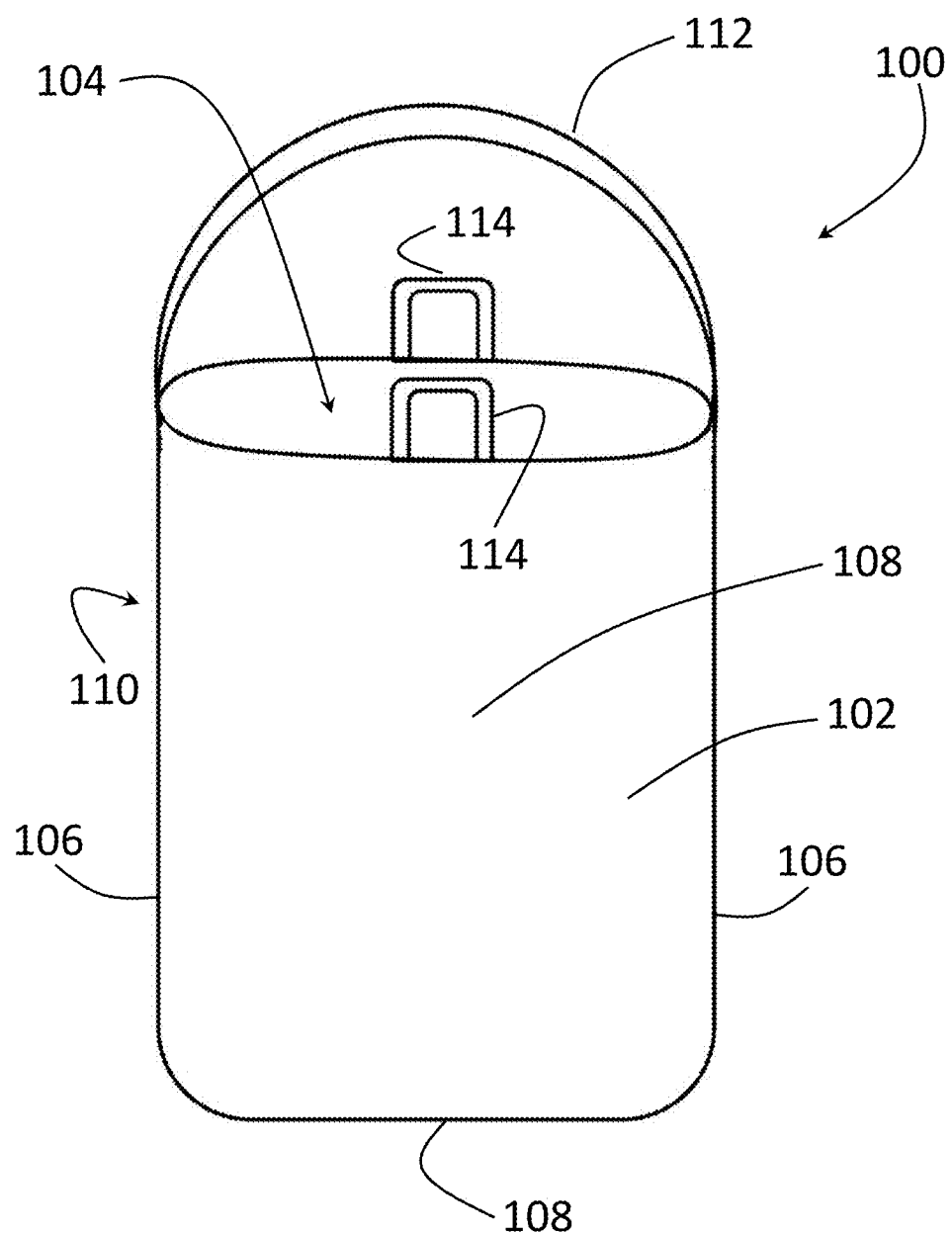
FIGS. 1-2 depict aspects of a reusable bag according to exemplary embodiments hereof.

As used herein, unless used otherwise, the following term has the following meaning:

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

The following detailed description is not intended to limit the current invention. Alternate embodiments and variations of the subject matter described herein will be apparent to those skilled in the art.

The system 10 according to exemplary embodiments hereof is described with reference to FIGS. 1-4, 5A, 5B and 6-7. Where the same or similar components appear in more than one figure, they are identified by the same or similar reference numerals.

In general, the system 10 may generally manufacture, deploy, track, refurbish, maintain, redeploy and generally control all aspects of the reusable bags for use for a variety of different purposes in a variety of different industries. The system 10 may include a reusable bag 100, a product deployment assembly 200 and a control platform 300. The reusable bag 100 may include a specifically designed durable and reusable bag 100 that may be deployed to customers for use to carry items (e.g. items purchased at a store). In this way, the reusable bag 100 may be used in lieu of disposable throw-away bags. The reusable bag may be deployed, tracked, received back, inventoried, refurbished and redeployed as desired. The reusable bag 100 may include other elements and functionalities that will be describe in later sections. The reusable bag may also be repurposed and/or recycled once the bag 100 may become unusable as a carrying bag (e.g. worn out). For example, the bags 100 may be recycled and be used to produce other elements of the system 10 such as the return bins, kiosks, warehouse equipment/furniture, park benches, playground equipment for schools and communities as well as other products and parts.

The system 10 may provide for a sustainable system to provide, track, maintain, refurbish, redeploy and repurpose reusable bags 100. This may allow for the system 10 to evolve with technological advances related to sustainable systems and businesses.

The deployment assembly 200 may include a kiosk, station, stall, booth or other type of structure that may hold an inventory of the reusable bags 100 and that may deploy the bags 100 to customers for use. The product deployment assembly 200 may also include security features and elements that may lock or otherwise keep the reusable bags 100 safe within the assembly 200, that may release the bags 100 upon an interaction with a customer, may track the release of the bags 100, may receive the bags 100 upon the customer return of the bags, as well as other functionalities as will be described in later sections. Note that the deployment assembly 200 may be a single self-contained unit that may include all of its functionalities, or the assembly 200 may include one or more separate and distinct units (e.g. a return bin may be separate from the deployment kiosk 200).

The system 10 may include a control platform 300 that may include a controller that may include hardware and software that may inventory the reusable bags, track the reusable bags 100, collect and mine customer usage data, as well as other functionality as will be described in later sections.

The system 10 may be deployed and operated in areas such as grocery stores where it may be beneficial to offer reusable bags to customers in lieu of disposable bags which are known to be harmful to the environment. The system 10 may be deployed in other types of retail (or wholesale) stores as well such as volume discount stores, convenience stores or any other type of retail outlets. College campuses may also benefit from the system 10 by offering reusable bags to their students for use on campus and in the campus stores. Note that these examples are meant for demonstration purposes and that it will be appreciated by a person of ordinary skill in the art, upon reading this specification, that the system 10 may be deployed and operated in a wide variety of areas, industries and channels and that the areas in which the system 10 is deployed and operated does not limit the scope of the system 10 in any way.

The Reusable Bag

The reusable bag 100 may include a bag that may be formed of preferably durable materials such as non-woven polypropylene or other materials. It may also be preferable for the reusable bag 100 to comprise recycled materials such that the bag 100 may provide further benefits to the environment. To this end, it may be preferable that the bag 100 be made of up to 80% post-consumer material. Other compositions of recycled materials may also be used. In one example, the bag 100 may be at least 120 GSM (grams per square meter) thick, but other thicknesses may also be used. In any event, it is preferable that the reusable bag 100 be adequately thick and durable so that it may withstand multiple uses. The reusable bag 100 may also be biodegradable and/or dissolvable so that the bag 100 may not have an adverse impact on the environment.

The reusable bag 100 may have a body 102 and an opening 104 (e.g. a top opening 104). The bag 100 may also include sides 106 and a bottom 108 (preferably closed). The body 102 of the bag 100 may include a front side 108 and a back side 110. In this way, items to be held and carried may be placed within the bag 100 and may be held thereby. Note that other shapes and configurations of bags 100 are also within scope of this disclosure, and that the shape and form of the bag 100 does not limit the scope of this disclosure in any way.

The bag 100 may include at least one top handle 112 that may be used to generally hold and carry the bag 100. The handle 112 may be formed as any type of handle 112 such as a shoulder strap, a handle meant to be generally held in the hand of the person carrying the bag 112, or other types of handles 112. The handle 112 may be padded, may be a single strap, multiple straps or any combination of different types of handles 112 or straps. It should be clear that any type of handle that allows for the bag 100 to be held or carried is within the scope of the invention and the invention is not limited in its scope in any way by the type of handle 112 that may be included with the bag 100.

Note that the reusable bag 100 may come in different sizes, shapes and types. For example, some reusable bags 100 may be standard tote bags, while other bags 100 may be larger bags 100 with shoulder straps, or cooler bags 100 that may have temperature insulation to keep frozen goods cold. In some embodiments, the reusable bags 100 may be hard containers to hold fragile goods safe from breakage. In this example, the bag 100 may not be a bag 100 but may instead be a box, a case, or any other type or combinations of types of containers. It is clear to a person of ordinary skill in the art that the reusable bags 100 may be any type of container, or any combination thereof, and that the scope of the system 10 is not limited by the type of reusable container that the system 10 may deploy. For the purpose of this specification, the term bag 100 will be understood to include any type of reusable container, including, but not limited to, bags, cases, boxes, crates, pouches, or any other types or combination of types of containers 100.

The reusable bag 100 may also include at least one locking loop 114 that may be used to generally hold and lock the reusable bag 100 within the deployment assembly 200. This will be described in later sections. It may be preferable for the reusable bag 100 to include at least two locking loops 114 as depicted in FIG. 1, but other numbers of locking loops 114 may also be used. It may also be preferable that the locking loops 114 be generally located at the top of the bag 100 (e.g. one locking loop 114 on the front of the top opening 104 and one locking loop on the back of the top opening 104). In this configuration, it may be preferable that the two locking loops 114 may overlap one another or otherwise correspond when the bag 100 is laid flat. In this way, a locking mechanism (e.g. a rod or shaft as described below) may pass through the openings of both loops 114 to lock the bag 100 in place. The locking loops 114 may be sewn onto the bag 100 or otherwise formed with the bag 100 or attached in a way that the loops 114 may remain securely attached to the bag 100 for the life of the bag 100. It is clear that the locking loops 114 may be separate and distinct from the handle 112, but in some embodiments, all or a portion of the locking loops 114 may be the same as or configured, at least in part, with the handle 112.

The locking loops 114 and the handle 112 may be formed of nylon, polyester or any other type of material or webbing that may be adequately strong and enable the locking loops 114 and the handle 112 to perform their respective functionalities. The locking loops 114 may be reinforced with metal wire or other types of reinforcement materials that may be integrated into the loops 114 and the bags 100. It may not be necessary for the handle 112 and the locking loops 114 to comprise the same material or materials, but this may be the case in some exemplary embodiments. Note that the locking loops 114 may be manufactured with the bag 100 (e.g. attached to the bags 100 during the manufacturing of the bags 100), may be added after the manufacturing of the bag 100 (e.g. attached to the bags 100 after the bags 100 have already been manufactured and are in stock), or any combination thereof.

In some exemplary embodiments, the locking loops 114 may comprise grommets or other types of mechanisms that may integrated or otherwise configured with the body 102 of the reusable bag 100. In these embodiments, the locking loops 114 may not necessary extend outward away from the body 102 of the bags 100, but may be holes, cutouts or other types of openings 114 or locking mechanisms that may be configured with the bags 100. The openings may be reinforced (e.g. by use of a grommet or other type of structure or mechanism).

In general, the reusable bag 100 may be stored within the deployment assembly 200 until deployed to a customer. The bag 100 may then be used by the customer to carry items (e.g. groceries) and then returned by the customer to the deployment assembly 200 or to a separate return bin.

In addition, the reusable bag may include advertising on its front 108, back 110 or on any other side or area of the bag 100. The advertising may include words and graphics that may advertise any type of brand, product or service or any other type of marketing or advertising. The advertising may be paid advertising such that it may generate revenue for the organization that may be offering the bags 100 for use.

For example, a grocery store that may offer the reusable bags 100 to their patrons may also pay to have advertisements included on the bags 100 promoting their store. In another example, local establishments that may be located near the store where the bags 100 may be available may pay to have advertising on the bags 100 for their products or services. It is clear that the advertising that may be included on the bags 100 may be any type of advertising or marketing and that the type of advertising on the bags does not limit the scope of the reusable bags 100 in any way.

The advertising may be printed directly onto the front 108, the back 110 or on any other sides or locations on the bags 100. In addition, it may be preferable that the advertising be interchangeable so that the advertising on the bags 100 may be changed when one advertising campaign may be over and another advertising campaign may begin. In this way, the bags 100 may continue to be deployed but with different advertising messages on the bags 100.

Figure 2:
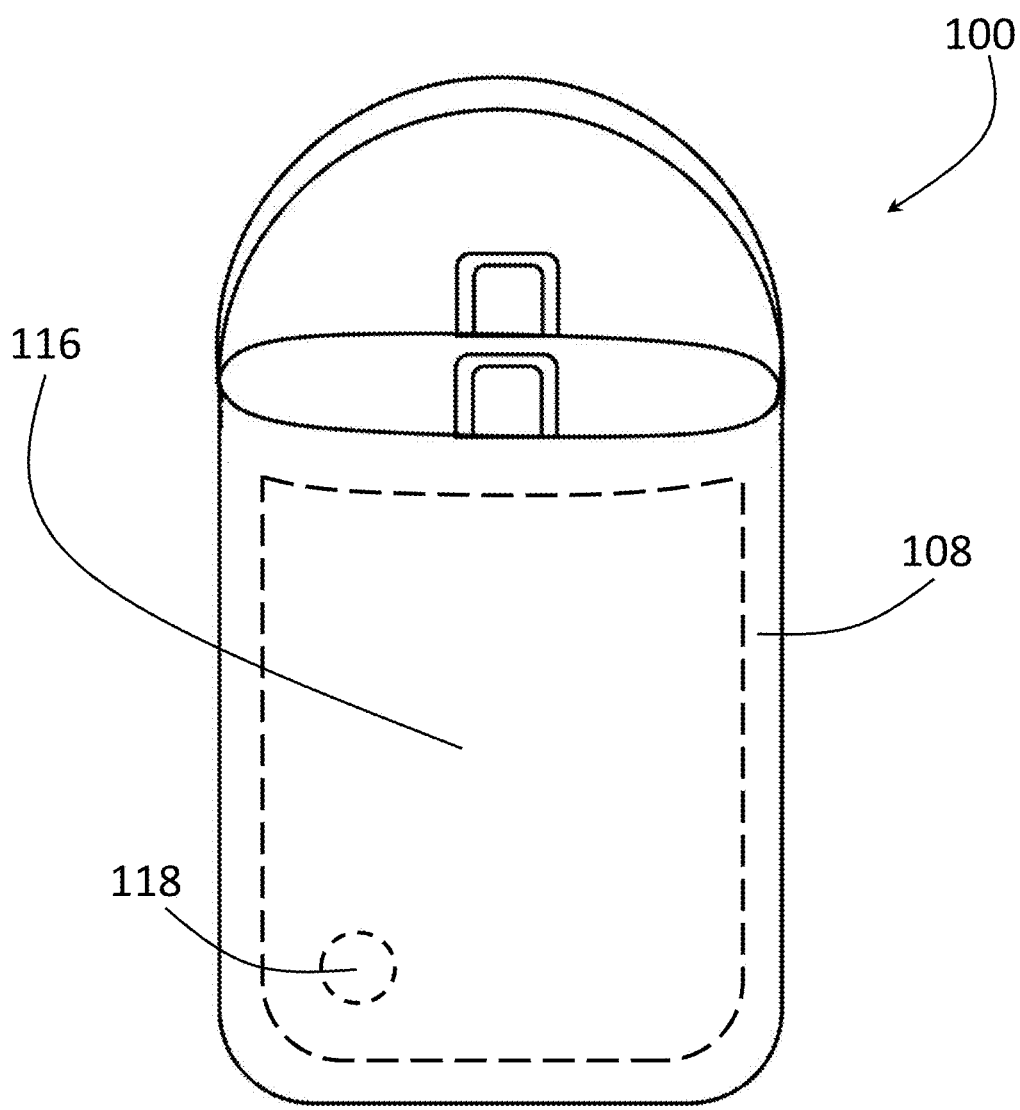

In one example as shown in FIG. 2, the bags 100 may include an advertising panel 116 that may be stitched onto the front side 108 and/or the back side 110 of the body 102 of the bag 100. The advertising panel 116 may include the graphics and/or text of the advertisement(s) to be displayed on the bag 100. In this way, it may not be necessary for the reusable bag 100 to include the advertising graphics and/or text on its more permanent surfaces, but instead may include the advertising graphics and/or text on the advertising panel 116 configured with the bag 100. Note that the reusable bag 100 may include one or more advertising panels 116 on one or more of its surfaces (e.g. on its front 108, its back 110 or on any other surface of the bag 100). It may also not be necessary for the bags 100 to include the advertising panel 116.

The advertising panel 116 may be attached onto the front 108, the back 110 or on any other surface using stitching or other attachment mechanisms. It may be preferable that the stitching that may secure the advertising panel 116 to the bag 100 be strong enough to secure the advertising panel 116 to the bag 100 for the lifespan of the advertising panel, but that the stitching may also be removed (e.g. cut or severed) when desired so that the advertising panel 116 may be removed from the bag 100. In this way, the advertising panel 116 may be removed and replaced by a new advertising panel 116 as necessary when it may be desired to change the advertisement that may be displayed on the reusable bag 100. The area of the bag 100 that may repeatedly receive the stitching to attach the advertising panel 116 to the bag 100 may be reinforced such that the repeated stitching and subsequent removal of the advertising panel 116 may not degrade or otherwise compromise the functionality or integrity of the bag 100. For example, in the example depicted in FIG. 2, the advertisement panel 116 may be stitched to the bag 100 in the general area of the outer circumferential perimeter of the front 108 of the bag (denoted by dashed lines in FIG. 2). Accordingly, it may be preferable that the area of the bag 100 that corresponds to this area may be reinforced as necessary.

The advertising panel 116 may be formed of the same material as the bag 100 or may be formed of different materials or different combinations of materials. In addition, the advertising panel 116 may be formed of a thinner material, a thicker material or a material with similar thickness compared to the material that may be used to form the front 108 or the back 110 of the bag 100. However, it should be clear that the advertising panel 116 may be formed of any material or any combination of materials as desired. It is also clear that the bag 100, the handle 112, the loops 114, the advertising panel 116 or any other element or components of the bag 100 may be formed of any color of any type of material.

The reusable bag 100 may also include a sleeve or layer (preferably on its outer surfaces) that may allow for the advertising panel 116 to be slipped into and held visibly in place.

The reusable bag 100 may also include a tracking element 118 that may comprise a RFID element, chip, tag or other type of tracking device or mechanism. In one example, the chip 118 may be attached to the bag 100 in the area between the bag 100 and the advertising panel 116 (e.g. in the lower corner of the front 108 of the bag 100 as depicted in FIG. 2) such that it may be covered and generally concealed by the advertising panel 116. The sensor 118 may be sewn onto the bag 100, glued onto the bag 100, snapped onto the bag 100 or attached to the bag 100 using any adequate method of attachment. The chip 118 may be configured with the bag 100 in any other locations on the bag 100 that may allow for the chip 118 to perform its functionality, and the scope of the system 10 and the bag 100 is not limited by the location of the RFID device 118. Each chip 118 may include a unique identifier (e.g. a serial number) such that each bag 100 may be uniquely identified using its respective chip 118. The purpose of the element 118 (e.g. an RFID tag) will be described in later sections.

In addition, the reusable bags 100 may include indicators that may represent the due date and other information regarding the reusable bag 100. For example, the due date may appear on the reusable bag 100 (e.g. using a LED or other type of indicator). In another example, the time elapsed since deployment of the bag 100 may be indicated. Color codes may also be used that may change colors to represent the approaching due date to return the bag 100. Audible indicators may also be used. Note that the indicators may be configured with the RFID chips to set and track the time elapsed since checkout.

The Product Deployment Assembly

The product deployment assembly 200 may generally include a station or structure that may store, hold, inventory, deploy, track and receive the reusable bags 100. It may be preferable that the deployment assembly 200 have a physical footprint that may allow for the assembly 200 to be located in stores and other locations that may benefit from the use of reusable bags 100. It may also be preferable that the structure be mobile, at least in part, so that it may be easily moved from one location to another.

Figure 3:
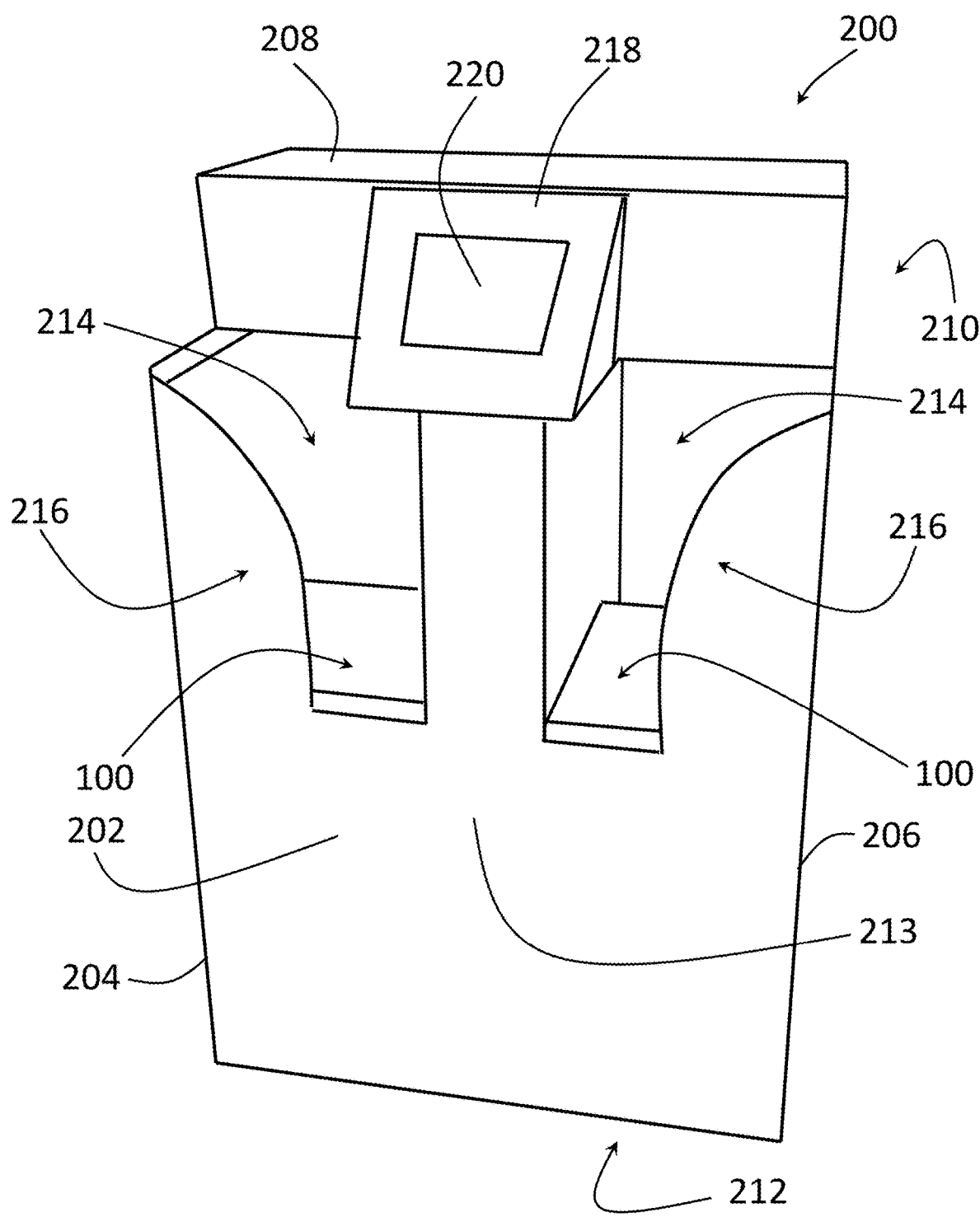
FIGS. 3-4 depicts aspects of a reusable bag deployment station according to exemplary embodiments hereof.

As shown in FIG. 3, the deployment assembly 200 may include a structure with front 202, a left side 204, a right side 206, a top 208, a back 210 and a bottom 212. The front 202 of the assembly 200 may include a front wall 213 that may generally secure the contents of the assembly 200 inside. The front wall 213 may include one or more openings 214 or cutouts that may allow for the removal and general deployment of the reusable bags 100 that may be stored inside. The assembly 200 may be a kiosk, a booth, a stand or any other types of structures or combination of structures that may generally perform the functionality as described herein. Note that the example shapes and forms of the deployment station 200 as described in this specification are meant for demonstration and conceptual purposes, and that the deployment station 200 may take any form, shape or size necessary to adequately perform its functionalities. It is clear that the deployment station 200 is not limited in any way by the shape, form or size that the deployment station 200 may take. In addition, different deployment stations 200 may take different forms or shapes and sizes depending on their intended use.

The deployment station 200 may generally include at least one chamber 216 that may store and deploy the reusable bags 100. Each chamber may include an opening 214 through which the reusable bags 100 may be deployed. In the example shown in FIG. 3, the deployment assembly 200 may include two product chambers 216, with one product chamber 216 on the left and one product chamber 216 on the right. Note that the assembly 200 may include any number of product chambers 216 in any orientation or location with respect to one another and the deployment kiosk 200, and that the scope of the assembly 200 is not limited by the number of chambers 216 or the orientation of the chambers 216 that the assembly 200 may include.

Note that the chambers 216 may be sized and shaped to house the types, shapes and sizes of the reusable bag 100 that may be deployed by the kiosk 200. For example, one chamber 216 may be designed to hold a reusable bag 100 that may be a medium sized tote bag 100, while another chamber 216 may be designed to hold a larger reusable bag 100 that may be a temperature insulated bag 100. Chambers 216 may also be designed to hold any combinations of types, shapes and sizes of the reusable bags 100. In this way, the kiosk 200 may offer different types and versions of the reusable bags 100. Accordingly, a customer may choose one type or a variety of types of bags 100 depending on what they may intend to carry in the bags 100.

The deployment assembly 200 may also include a controller 218 that may include an interface 220 (e.g. a touchscreen as shown in FIG. 2). The controller 218 may generally facilitate interaction between a customer and the deployment assembly 200. This interaction may include, but is not limited to, the customer registering with the system 10, the customer identifying themselves (i.e. checking in), the customer choosing to receive one or more reusable bags 100, the customer paying for the reusable bags 100, the customer checking out, the customer receiving the reusable bags 100, as well as other interactions and activities. This will be described in more detail in later sections.

Figure 4:
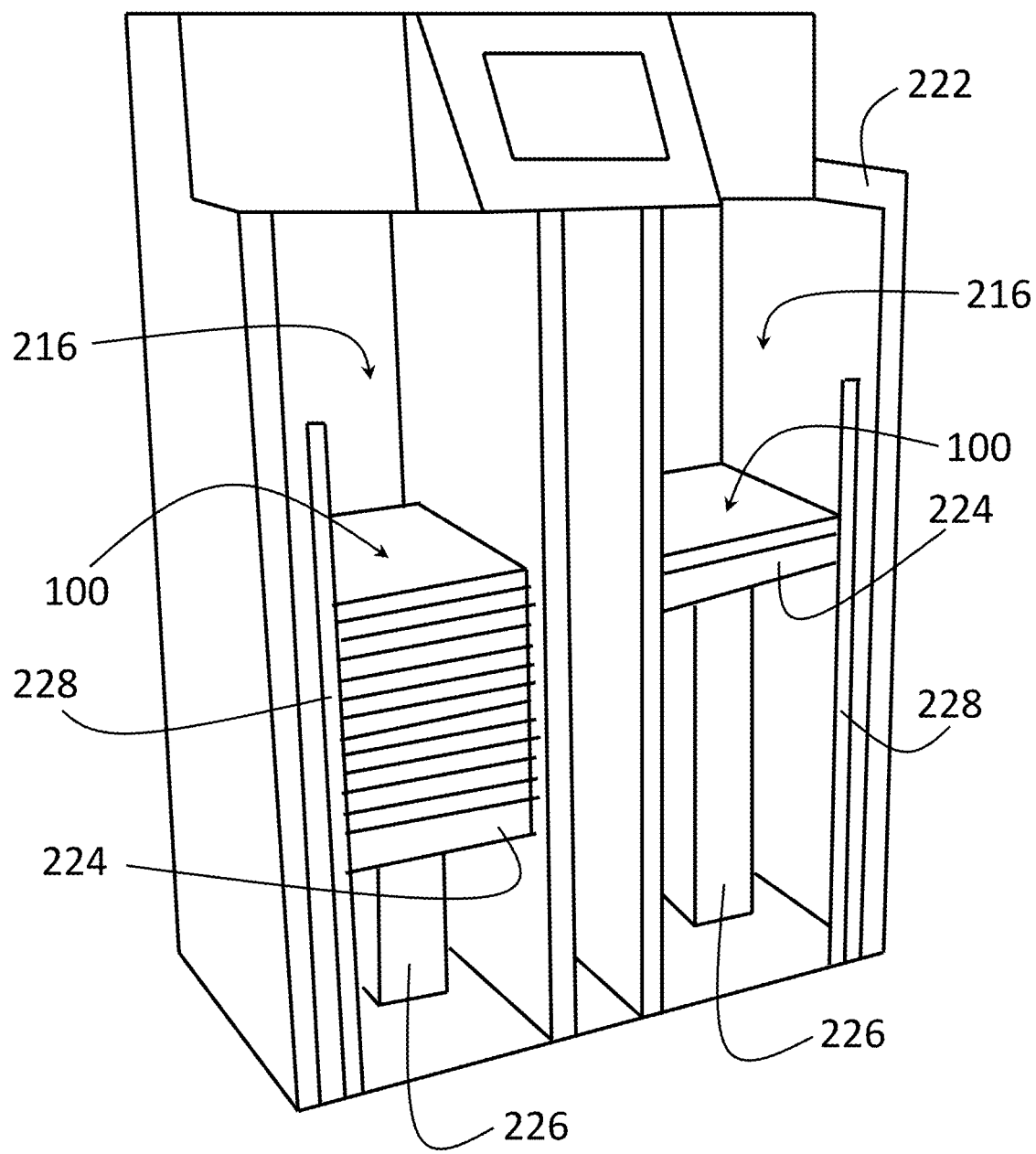

As shown in FIG. 4, the deployment assembly 200 may also include a structure or frame 222 that may generally add stability and reinforcement to the assembly 200. The structure 222 may comprise any strong material, e.g. aluminum, steel, iron, plastic, a composite material, or any other type of materials or combination of materials that may be adequate. The purpose of the structure 222 may be to generally support the various components and elements of the deployment assembly 200. Note that the frame 222 may take any shape or form, and be of any size as necessary.

It may be preferable for the product chambers 216 configured within the deployment assembly 200 to include a size and shape that may accommodate a stack or other type of collection of reusable bags 100. In the example shown in FIG. 4, the product chambers may be generally rectangular with a length and width that may generally correspond to the width and length of the reusable bags 100. In this example, the reusable bags 100 may be generally stacked vertically within the product chambers 116.

The product chambers 116 may also include a platform 224 upon which the stack of reusable bags 100 may be placed. It may be preferable for the platform 224 to be supported by a support device 226 and at least one platform guide 228 that may generally support the platform 224 while allowing the platform 224 to move up and down in the vertical direction. In the example shown in FIG. 4, the support device 226 may comprise one or more compressed springs. Note that other types of support devices 226 may also be used such as gears, shafts, levers, and other types of support devices that may support the platform 224 while allowing it to move up and down. Note also that the support device 226 may be passive (e.g. compressed springs), active (e.g. electronic/motorized), or a combination of both passive and active mechanisms.

The support device 226 may be chosen to generally support the weight of the stack of reusable bags 100 that may be positioned on the platform 224 at any given time, and to position the stack of reusable bags 100 so that the top bag 100 on the stack may be accessible to a potential customer. It may be preferable that the support device 226 compress under the weight of the reusable bags 100 and that the support device 226 generally provide an upward force to the platform 224 to keep the top of the stack of reusable bags 100 at a particular position (e.g. a position that may be accessible by a potential customer through the opening 214).

Returning to FIG. 3, it can be seen that the front openings 214 of the deployment assembly 200 may be positioned to allow access to the top reusable bag 100 on the stack. In this way, with the support device 226 supporting the platform 224 with an upward force, the top reusable bag 100 on the stack of reusable bags 100 on each platform 224 may be held in an accessible position.

Note that FIG. 4 depicts two product chambers 216 each with a platform 224 holding a stack of reusable bags 100. Also note that the platform 224 in the left chamber 216 may be configured with a substantially larger number of reusable bags 100 compared to the platform 224 in the right chamber 216. It can be seen that even though each platform 224 may hold a different number of reusable bags 100, the top reusable bags 100 on each respective stack may be accessible through the front openings 214 on the left and on the right. In the example shown, it is seen that the top reusable bag 100 on each stack may be generally positioned at the same or similar height with respect to the front of the deployment assembly 200 and the openings 214 thereof. In this case, the support device 226 may be calibrated with the weight of the reusable bags 100 such that the support device 226 may compress and extend with the removal and addition of the reusable bags 100 while maintaining the top of the stack at a constant level. Note however that this may not be necessary and that it may be adequate for the support device 226 to generally support the platform 224 and the stack of reusable bags 100 at any level that the top bag 100 may be accessible through the front openings 214.

The platform 224 may also be supported along the vertical axis by at least one platform guide 228. The platform guide 228 may comprise a vertical shaft, frame or pole that may be configured with the platform 224 to provide lateral support to the platform 224 as it supports the stack of reusable bags 100 and moves up and down to receive and deploy them. Note that while FIG. 4 depicts one platform guide 228 on the left to support the platform 224 within the left chamber 216, and one platform guide 228 on the right to support the platform 224 within the right chamber 216, any number of platform guides 228 in any locations, orientations and positions may be utilized as necessary.

Figure 5A:
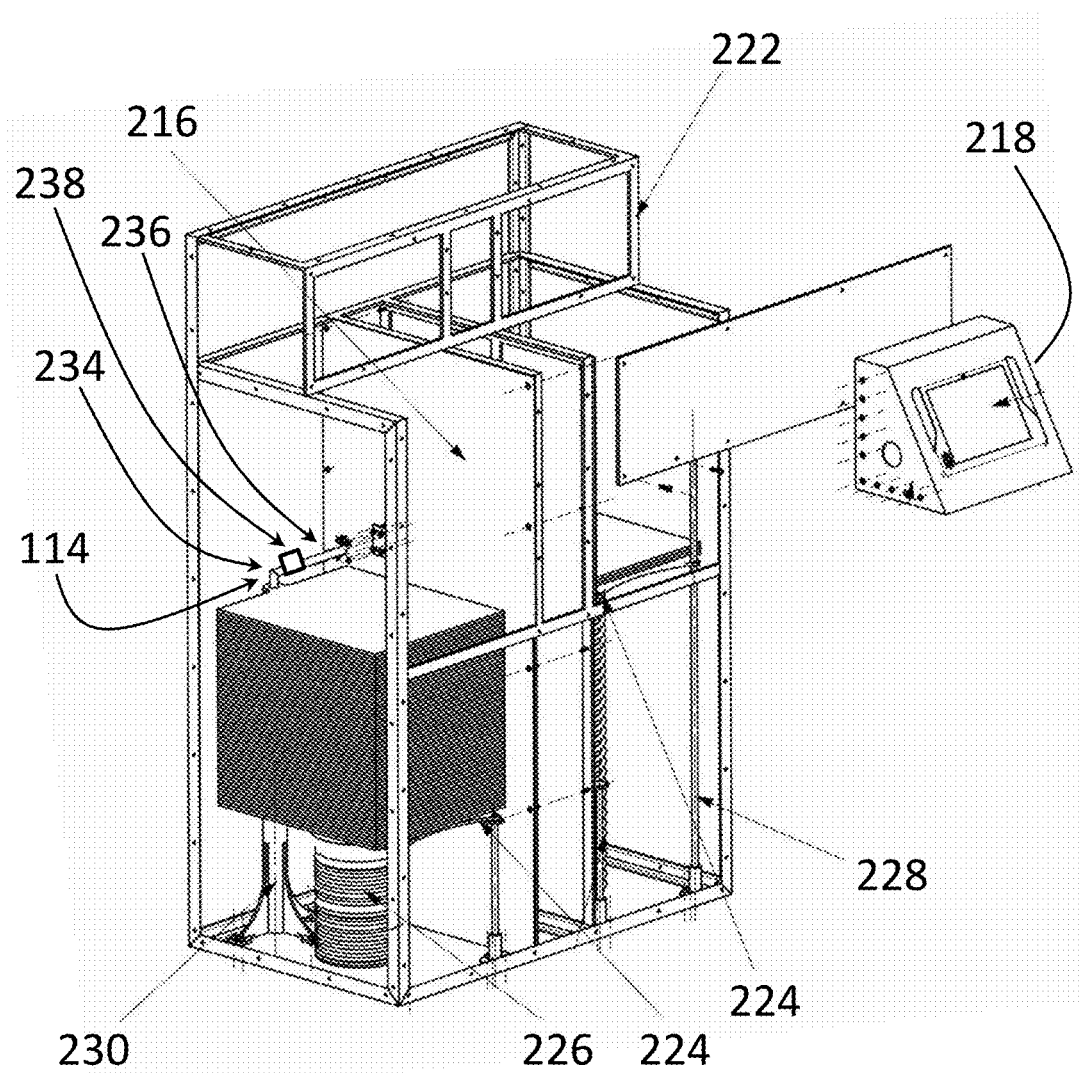
FIGS. 5A-5B depict aspects of a reusable bag deployment station according to exemplary embodiments hereof.
Figure 5B:
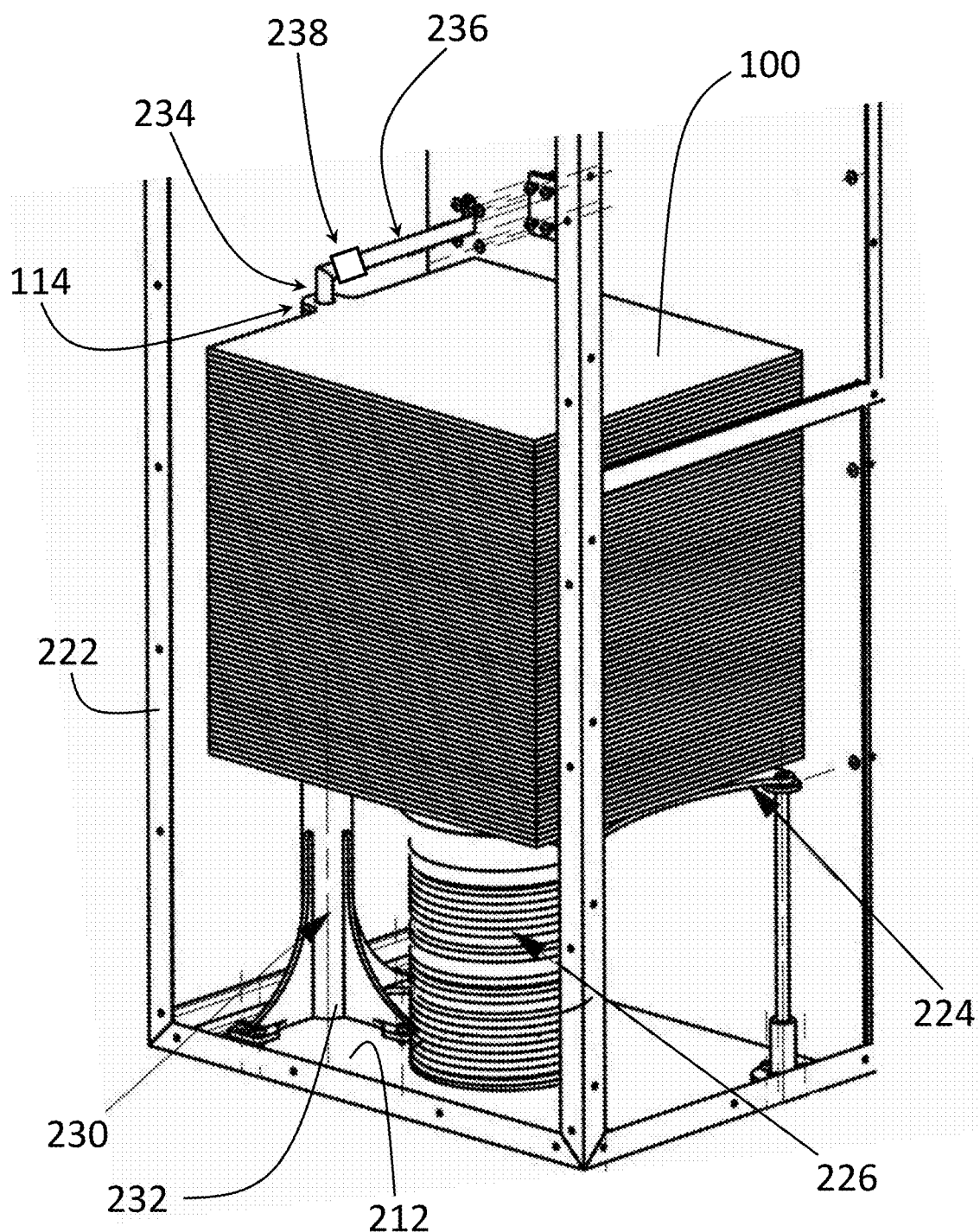

As shown in FIGS. 5A and 5B, each chamber 216 within the deployment assembly 200 may include a master platform guide 230. The master platform guide 230 may be generally positioned at the back of the chamber 216 but may also be positioned in other locations within the chamber 216 as necessary to perform its functionality. The master platform guide 230 may act as a vertical support or guide to the platform 228 as well as a locking mechanism for the reusable bags 100. Note that the deployment kiosk 200 may include other components and elements that may also act as a locking mechanism to releasably secure the bags 100 within the kiosk 200.

In one exemplary embodiment described herein, the master platform guide 230 may include a base 232 that may be generally anchored and attached to the bottom 212 of the assembly 200. The master guide 230 may also comprise a shaft or rod 234 that may generally configured with and extend upward from the base 232. The rod 234 may comprise metal such as steel, iron, aluminum or other types of materials such as hard plastic, wood or any other type of adequate material or combinations of materials.

As shown, the reusable bags 100 that may be stacked upon the platform 224 may be oriented such that their respective locking loops 114 may be generally aligned with each other and with the upward extending rod 234. In one example, the bags 100 may be generally stacked on the platform 224 and aligned such that their respective locking loops 114 may generally face towards the back 210 of the kiosk 200. In this way, the upward extending locking rod 234 may pass through the locking loops 114 of each reusable bag 100 in the stack simultaneously. By passing through the locking loops 114 of each bag 100, the shaft 234 may effectively hold the bags 100 in alignment. Note however that the bags 100 and the locking rod 234 may be oriented facing other directions such as towards the front of the kiosk 200, towards the sides of the kiosk 200, towards the inner portion of the kiosk 200, or in any other orientation or combination of orientations. Also, if the kiosk 200 may include more than one platform 224, it is clear that each platform 224, stack of bags 100 and locking rod 234 may or may not be oriented in the same or similar orientations with respect to one another.

The top of the locking rod 234 may be configured with a second section 236 that may be generally horizontal with respect to the locking rod 234 (although other orientations are also considered). The section 236 may generally extend from the junction with the upright rod 234 to an inner wall within the chamber 214 (e.g. a divider wall between the two chamber 214 as shown in the example of FIG. 4, 5A, 5B, or to the back wall, a top wall, etc.), or to any other portion of the frame 222 or kiosk 200. The end of the section 236 that may extend from the junction with the rod 234 to the structure 222 may be attached to the structure 222 using bolts, screws, welding, or other types of attachment means or mechanisms.

The junction between the upright locking rod 234 and the second section 236 may include an engagement mechanism 238. The engagement mechanism 238 may generally releasably lock or otherwise attach the top end of the rod 234 to the free end (e.g. the end not configured with an inner wall of the kiosk 200) of the second member 236. The engagement mechanism 238 may be closed or locked (e.g. as shown in FIG. 5B) to secure and lock the reusable bags 100 within the kiosk 200, or the engagement mechanism 238 may be opened or unlocked to allow the removal of the reusable bags 100. When opened or unlocked, the upper end of the locking rod 234 may be unobstructed so that one or more reusable bags 100 may be generally lifted from the rod 234, or otherwise moved, and the locking loops 114 of the desired reusable bags 100 may be thereby released from the rod 234.

The locking mechanism 238 may be an electronic bolt, and electromagnetic lock, a latch, a hitch, a switch or any other type of locking mechanism 238 that may generally releasably attach or lock the upper end of the rod 234 with the free end of the second section 236.

It may be preferable that the locking mechanism 238 may be controllably unlocked or released, e.g. by the user interacting with the control interface 220, for the removal of the desired reusable bags 100. It may also be preferable that after the desired reusable bags 100 may have been removed from the rod 234 and the kiosk 200, that the locking mechanism 238 may reengage, reattach, relock with the locking rod 234 such that the remaining reusable bags 100 may be secured and locked within the kiosk 200 until controllably released again.

Note that while the attachment mechanism 238 is depicted as being configured at the junction between the top of the locking rod 234 and the free end of the section 236, the attachment mechanism 238 may be located or configured in any location along the rod 234 or second section 236 that may allow for the reusable bags 100 to be release and removed. For example, the engagement mechanism 238 may be positioned anywhere along the second section 236. In this example, when the engagement mechanism 238 may open, the second section 236 may generally open into several sections with open ends. The reusable bags 100 may then be removed from the open end of the second section 236 and the ends may then be reconfigured or relocked to again secure the remaining reusable bags 100.

In another example, the engagement mechanism 238 may be positioned at the junction between the second section 236 and the structure 222 and/or inner wall of the kiosk 200. In this example, the second section 236 may be released from the structure 222 and the desired reusable bags 100 may be moved from the upright rod 234, onto the second section 236 and then released off the open end. The engagement mechanism 238 may then reengage and the open end of the second section 236 may then be reengaged or locked with the structure 222, inner wall or other portion of the kiosk 200.

In another example, the engagement mechanism 238 may be configured anywhere along the locking rod 234, e.g. below the junction between the locking rod 234 and the second section 236. In this example, the locking rod 234 may open into several sections (when the engagement mechanism is disengaged) such that the reusable bags 100 may be removed from an open end of the rod 234. The engagement mechanism 238 may then reengage thereby locking the remaining reusable bags 100 on the locking rod 234.

In another example, the second section 236 may not be necessary and the locking mechanism 238 may be configured between the locking rod 234 and the structure 222, an inner wall of the kiosk 200 (e.g. the back wall) or to any other component of the kiosk 200. In this embodiment, the engagement mechanism 238 may disengage and generally release the top end of the rod 234 or in intermediary section of the locking rod 234 so that the reusable bags 100 may be removed. The engagement mechanism 238 may then reengage and relock the top end or intermediary section of the rod 234 with the structure 222, an inner wall, itself or any other portion of the kiosk 200.

In another exemplary embodiment, at least a portion of the locking rod 234 and/or the second section 236 may extend horizontally within the chamber 216, and the bags 100 may hang from a horizontal portion 234, 236 with the horizontal portion 234, 236 passing through the locking loops 114. In this example, the platform 224 may or may not be required, or may be formed as a horizontal support to keep the bags 100 in a horizontal position to be removed. In addition, the support device 226 may be oriented such that it may support the hanging bags 100 horizontally.

In another exemplary embodiment, the kiosk 200 may include a front door or sliding panels that may open to allow access to the bags 100 to be deployed. In this way, the sliding doors may act as the locking mechanism 238 to allow the bags 100 to be unlocked and removed.

It is clear to any person of ordinary skill in the art, upon reading this specification, that the locking rod 234 and/or the second section 236 and/or the reusable bags 100 may be configured in any orientation with respect to one another and in any configuration within the kiosk 200, and that the scope of the system 10 is not limited to the orientations, configurations, positions or locations of the rod 234 and/or the section 236 and/or the bags 100. Furthermore, the scope of the system 10 is not limited in any way with the location, position, configuration, orientation or any other characteristics of the engagement mechanism 238 with respect to the rod 234, the second section 236, the bags 100 or the kiosk 200. The engagement mechanism 238 may be configured with any portion of the rod 234, and/or the second section 236, and/or with any other component or element of the kiosk 200 that may allow for the engagement mechanism 238 to generally disengage and unlock the reusable bags 100 for removal from the kiosk 200, and then reengage to generally lock the remaining removable bags 100 within the kiosk 200.

The controller 218 may include any type of controller that may have the ability to control the various functionality of the deployment assembly 200 as well as interface with the overall system 10. Accordingly, the controller 218 may include CPUs, microprocessors, microcontrollers, memory, communication interfaces (e.g. Wi-Fi, wireless, RFID, LAN, WAN, and any other type of communication interfaces for any other communication protocols or combinations of communication protocols), batteries (preferably rechargeable) or other types of power supplies, software, scripts, applications, and any other components, elements or mechanisms that may be necessary for the controller 218 to adequately perform its functionalities.

The controller may include an interface 220 that may allow a user to interact with the controller 218 and the deployment kiosk 200. The interface 220 may be a touch screen, a keyboard, an audio command interface, a brail interface, or any other type of interface 220 or combinations of types of interfaces 229 that may allow the user to sufficiently interact with the controller 218 and the kiosk 200.

In another exemplary embodiment, the controller 218 may include a mobile device that may perform all or some of the functionalities of the controller 218. The mobile device may be a dedicated mobile device with the kiosk 200 or may be a user's mobile device that may include an application (mobile "app"). The mobile device may allow the user to perform some or all of the functionalities necessary to check in with the kiosk 200, and request and receive the reusable bags 100.

The functionality of the controller 218 may include, but is not limited to, the following operations:

1. Allow the user to create an account with the system 10. The user may generally input his/her identification information, payment information (e.g. credit card information), contact information, preferences such as types of items he/she may intend to use the bags 100 for, as well as other information. Note that the user may also choose to use the system 10 and the kiosk 200 as a guest and may not be required to create an account.
2. Allow the user to check in. If a user may already have an account with the system 10, he/she may check in with the kiosk 200 to receive the reusable bag(s) 100. In this case, the user may enter a username and password into the interface 220. The user may also use a fingerprint scanner, a retina scanner, an audio voice recognition device, or any other type or combinations of types of identification devices that may be configured with the controller 218.
3. Accept payment from the user in the form of cash, credit card, debit card, PayPal®, Apple Pay®, Venmo®, or by any other payment methods. Note that in some cases a payment may not be necessary.
4. Allow the user to select the number and types of reusable bag 100 that they wish to receive.
5. Unlock the engagement device(s) 238 to allow the user to remove the reusable bags 100 that they may desire.
6. Scan the bags 100 as they are removed from the kiosk 200 (e.g. using RFID).
7. Provide a receipt to the customer in the form of a printed receipt, an emailed receipt, a texted receipt or any other type of receipt for the deployed reusable bags.
8. Allow the user to close the transaction, or close the transaction without the user.
9. Re-engage the engagement device 238 upon closing the transaction with the user.
10. Inventory the remaining reusable bags 100 within the kiosk 200.
11. Communicate with the system 10 regarding inventory levels, usage levels, and other pertinent information. This will be described in the next section with reference to the control platform 300.

It is clear to a person of ordinary skill in the art that the above examples of controller 218 functionalities is shown for conceptual and demonstrational purposes, and that the controller 218 and/or kiosk 200 may perform any type of operations and/or functions that may be required by the system 10. It is also clear that the scope of the system 10 is not limited in any way by the functionalities of the controller 218. Additional functionalities of the controller 218 will become clear upon further descriptions of the system 10.

The kiosk 200 may include RFID sensors, antennas, processors and any other RFID or tracking components, elements and/or mechanisms that may be required by the kiosk 200 to employ RFID sensing (or other types of tracking) of the bags as they may be removed from the kiosk 200. The reusable bags may also include RFID tags 118 that may be scanned by the RFID sensors as the bags 100 may be removed from the kiosk 200 by the user. In this way, the kiosk 200 may determine the exact number of bags 100 that may have been removed, as well as the identity of each bag 100 (e.g. each bag 100 and/or the RFID chip associated with each respective bag 100 may include a serial number that may be scanned and read by the RFID sensors within the kiosk 200). The controller 218 may also determine the types and/or versions of the reusable bags 100 (e.g. tote bags 100 vs. cooler bags 100) that were removed.

It may be preferable that the RFID sensors and/or antennas be located in close proximity to the openings 214 in the kiosk 200 so that the RFID tags 118 embedded with the reusable bags 100 may be scanned as the bags 100 may pass through the openings 214. Any location of the RFID sensors and/or antennas that may allow for the scanning of the RFID chips 118 within the bags 100 as the bags 100 are removed from the kiosk 200 may be adequate. As the bags 100 are removed, the controller 218 may read the number of bags 100 removed, the serial number of each bag 100 removed, as well as any other pertinent information that may be read by the RFID sensors and/or antennas.

In addition, the kiosk 200 may include RFID absorbers and/or guides that may absorb the RF energy in specific areas and direct the RF energy to other areas that as may be required.

The kiosk 200 may also include a return bin (not shown) that may generally receive the reusable bags 100 from the users upon the users being finished using them. The users may return the reusable bags 100 upon the expiration of their usage term, upon which time they can extend their term, check out new reusable bags 100, or simply return the used reusable bags 100 to the system 10. It may be preferable that the return bin include RFID sensors that may track each bag 100 that may be received so that the system 10 may inventory that bag 100, credit the user for the return of the bag 100, as well as any other functionality that may be necessary. Note however that this may not be necessary and that the returned bags 100 may be tracked and re-inventoried by other mechanisms (such as at the main facility as will be described in later sections).

Alternatively, or in combination, the return bin may be a separate structure that may not be physically configured with the kiosk 200. In this case, the return bin may be located in close proximity to the kiosk 200 or may be located in other areas that may be convenient for the users to return the used reusable bags 100. In any event, it may be preferable that the return bins have the ability to track the returned bags 100, and to communicate with the control platform 300 as described in the next section. In this way, the user may return the reusable bags 100 to the system 10 in areas that may be the same as the original kiosk 200 from which they received the bags 100, or to other locations that may be different from the original kiosk 200.

The product deployment assembly 200 may include a door or other type of opening that may allow for the reusable bags 100 to be placed into and generally stocked within the kiosk 200. For example, the left and/or right sides 202, 204 may include a lockable door that may be opened to give access to the chamber 216 and the platform 224 within each chamber 216. In this way, the door(s) may be opened, and the new bags 100 may be placed on the platform 224. It may be preferable that the person who may be replenishing the bags 100 into the kiosk 200 may have a master code (or any other type of identification, key, etc.) that he/she may enter into the controller 218 that may unlock the engagement mechanism 238 so that the locking loops 114 of the new bags 100 may be configured with the locking rod 234 and/or the second section 236. The engagement device 238 may then be reengaged and the bags 100 may be secured within the kiosk 200. The controller 218 may sense the number of new bags 100 by means of the RFID sensors, weight placed on the support structure(s) 226, or the person replenishing the kiosk 200 may enter the new inventory information directly, through the system 10, through a mobile app, or by other means.

In other exemplary embodiments, the kiosk 200 may be integrated into the checkout counter at a retail storefront. In this case, the chamber 214 of the kiosk 200 may be oriented horizontally, vertically or in any orientation as necessary to deploy the bags 100 upon customer checkout. The bags 100 may be deployed in a convenient position with regards to the checkout counter so that the bags 100 may be easily accessed by the checkout attendant and/or the customer.

Note that the examples described above are meant for demonstration and conceptual purposes, and that the product deployment assembly 200 and its components and elements may take any form or shape and may have any dimensions that may be adequate to perform their respective functionalities. In addition, the components described may or may not all be included in the kiosk 200, and may take different forms and provide their functionalities in different ways compared to how they may be described above. Also, additional components and elements may be included in the product deployment assembly 200 that may not be described above as necessary for the product deployment assembly 200 to perform its functionalities. It is appreciated by a person of ordinary skill in the art, upon reading this specification, that the shape, form, dimensions, and other characteristics of the product deployment assembly 200 do not in any way limit the scope of the assembly 200. It is also understood that the type, shape, form, dimensions, and functionalities of the components and elements that may be included with the product deployment assembly 200 do not in any way limit the scope of the product deployment assembly 200, and that the product deployment assembly 200 may include any type of components and/or elements required to perform its various functionalities. For example, the kiosk 200 may not include the sides 204, 206 or the front 202, and may instead be a generally open structure with the reusable bags 100 secured within the structure by the locking rod 234 and locking mechanism 238. In another example, the kiosk 200 may include only a single chamber 216. It can be seen that the kiosk 200 may be formed as a unit with as small a footprint as necessary depending on the space allotted for the kiosk 200. Note that the deployment of the reusable bags 100 from the kiosk 200 may also be facilitated by an automated system such as a robotic system. In this case, the robotic system may effectively hand the reusable bags 100 to the users. In another embodiment, the robotic system may also assist with loading the user's contents to be carried into the reusable bag.

Control Platform

The system 10 according to exemplary embodiments hereof may also include a control platform 300 that may provide resources and/or mechanisms to support the system 10, the product deployment assembly 200 and the procurement, inventorying, maintenance, deployment, and restocking of the reusable bags 100. The control platform 300 may also perform other functionalities such as data collection, data mining and analysis, reporting and other functionalities.

Figure 6:
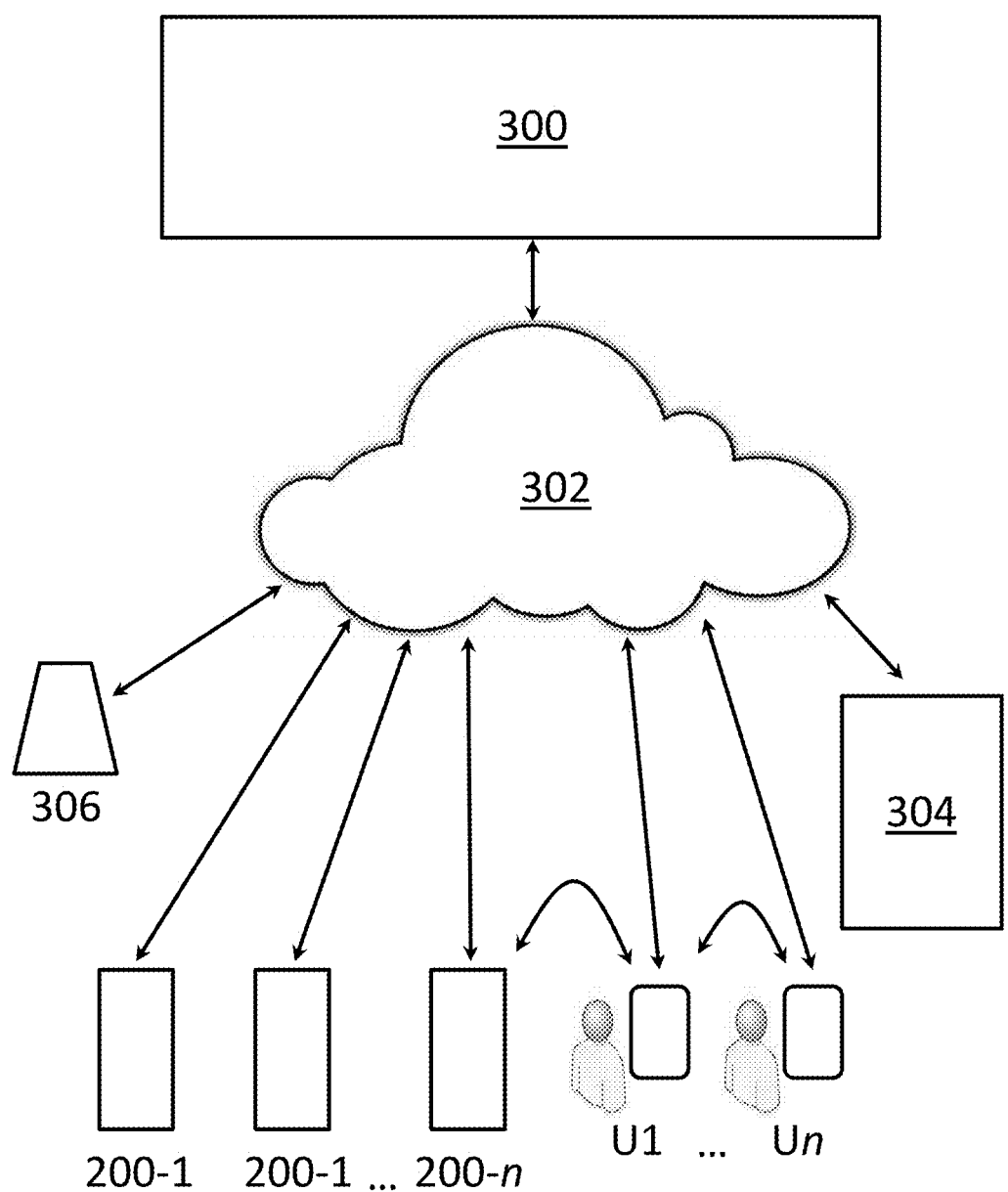
FIG. 6 depicts aspects of a reusable bag deployment system according to exemplary embodiments hereof.

As depicted in the drawing in FIG. 6, product deployment assemblies 200-1, 200-2 . . . 200-$n$ (individually and collectively 200) may each be in communication with the control platform 300 (also referred to the backend platform 300). The communication may occur through the a network 302 that may include the Internet, telephony networks, Wi-Fi networks, LAN, WAN, wireless networks, or any other type of communication networks or protocols, or combinations of communication networks or protocols.

Data from the deployment kiosks 200 may be communicated to the control platform 300, and data from the control platform 300 may be communicated to each kiosk 200 individually or collectively. Accordingly, each kiosk 200 may have an identifier such as a serial number, an IP address or other type of identifier so that the control platform 300 may identify each individual kiosk 200 as required. The data may include but is not limited to the inventory levels within each kiosk 200, the usage data, the user data (e.g. registration data, user preferences, etc.), problems that may exist with one or more kiosks 200 (e.g. error codes) as well as any other types of data.

The backend platform 300 may include one or more servers that may include CPUs, memory, software, operating systems, firmware, network cards and any other elements and/or components that may be required to the backend platform 300 to perform its functionalities.

Embodiments or implementations of backend platform 300 may include some or all of the functionalities, software, algorithms and mechanisms necessary to collect, communicate, correlate, process, analyze, report and otherwise use all of the data from the kiosks 200.

As shown in FIG. 6, individual users Un may also communicate with the control platform 200 via mobile devices, computers or other types of devices. The mobile devices may each include an application (e.g. a mobile app) or other type of software that may allow the devices to communicate with the control platform 200. In this way, the mobile devices may also communicate with the kiosks 200 via the control platform 200. It may be preferable for the users to have a registered account with the system 10 and the control platform 300 so that the control platform 300 may be able to identify each individual user to manage their account, bag usage, and other information and data, but this may not be necessary.

Note also as depicted in FIG. 6, each user Un may also communicate directly with an individual kiosk 200 using their mobile device (e.g. using the mobile app) or other type of device. This communication may occur through wireless networking, Wi-Fi, Bluetooth, cabling, or any other type method of communication.

In any event, communicating directly or indirectly with the kiosks 200 with their mobile devices and/or mobile applications may allow each user to register with the system 10 and the kiosk 200, log in, check out reusable bags 100 as desired, preorder reusable bags 100, review their account, bag usage, etc., receive account alerts (e.g. for missing or overdue bags), receive promotions from the system 10 regarding bag usage as well as other promotions such as store promotions, sponsor promotions, etc.

A backend platform 256 according to exemplary embodiments hereof may include services or mechanisms to support one or more of the following:

1. Track and manage inventory levels of the reusable bags 100
2. Track deployment, usage, return, maintenance and redeployment of each individual bag 100 or groups of bags 100
3. Collect and analyze user and use data, including correlating user demographics, preferences, usage data, and any other data or information
4. Generate reports for all services. This may include usage reports that may be provided to the sponsors that may pay for the advertising and marketing messages on the reusable bags 100 such that the sponsors may see the penetration of the advertising and marketing campaigns.

It will be understood by a person of ordinary skill in the art, upon reading this specification, that the functionality examples of the control platform 300 described herein are meant for demonstration purposes and that the control platform 300 may include any functionalities, operations and abilities that may be necessary for it to perform all of its functionalities required by the system 10, and that the functionalities listed do not limit the scope of the control platform 300 or the system 10 in any way.

Note that a device, while in communication with another device or with a kiosk 200, may also be connected to the backend platform 300 for support with one or more of its mechanisms.

The system 10 may also include a facility 304 that may be a physical facility such as a building, a warehouse, or any other type of physical structure that may allow for the reusable bags 100 to be stocked, inventoried, analyzed, refurbished, cleaned, manufactured, modified (e.g. with new advertising panels 116), redeployed, or any other action or combinations of actions that may be required by the system 10. As shown in FIG. 6, the facility 304 may also be in communication with the control platform through the network 302. Note that the facility 304 may communicate to the control platform 300 using a network 302 that may be different than the networks 302 that the kiosks 200 or the users Un may use to communicate with the control platform 300. For example, the facility 304 may communicate with the control platform 300 over Wi-Fi or LAN, while the kiosks 200 and/or the users Un may communicate with the control platform over wireless networks.

In another exemplary embodiment described herein, system 10 may also include a mobile scanner 306 that may be in communication with the control platform 300 and the system 10, and that may scan or otherwise identify the reusable bags 100 in areas that may or may not include the kiosk 200. For example, system 10 may be utilized by a product sales and delivery service (e.g. Amazon®) that may deliver all or at least a portion of the purchased products to the customer in the reusable bags 100. The user may order products from the product sales and delivery service through the Internet or through other sales channels, and choose to have the products delivered directly to them. In this case, the delivery service may scan the reusable bags 100 using the remote scanner 306 upon the delivery of the products within the bags 100. The scanner 306 may identify the quantity and the identification of the bags 100 (e.g. by serial number) that may be delivered to the customers. The customers may or may not be required to sign off for the bags, and/or be registered with the system. The mobile scanner 306 may communicate with the control platform 300 through the network 302 using any communication protocols (e.g. Internet, Wi-Fi, telephony, wireless, LAN, WAN, etc.). The mobile scanner 306 may utilize an RFID reader to scan the RFID chips integrated with each bag 100, or the bags 100 may include a barcode, a QR code or other identifying mechanism that the mobile scanner 306 may scan in order to retrieve the necessary information from the each bag 100.

In this way, the products may be delivered to the customer in the reusable bags 100 and the mobile scanner 306 may scan the bags 100 upon delivery and communicate this information to the control platform 300 and the system 10. The control platform 300 may then keep track of each deployed bag 100, the user accounts who received the bags 100, the products delivered in the bags, the user's preferences, the advertising campaigns on each bag 100 deployed, as well as any other pertinent information.

In this example, the product sales delivery service may integrate the system 10 into their infrastructure, may utilize the system 10 as a third-party supplier, or any combination thereof.

The user may then return the reusable bags 100 into the return bins as described above, or the product sales and delivery service may pick up the bags 100 upon their next delivery to the customer. In this case, the delivery service may again use the mobile scanner 306 to scan the returned bags 100 as well as any new bags 100 that may be deployed during the delivery. This information may then be communicated to the control system 300 and the system 10.

In another embodiment that expands upon the previous example, the customer may order products and choose to have the products delivered to another location for pick up (e.g. a local retail store). The products may be delivered to the location in the reusable bags 100 and the location (e.g. the store) may utilize a mobile scanner 306 to identify the bags 100. The location may also use a kiosk 200 that may be on the premises to scan the bags 100 (e.g. the kiosk 200 may include a scanner on the outer portion of the kiosk 200 that may be available to the customer or to the store). The location may also use a dedicated scanner that may be integrated with the store (e.g. at the checkout counter) and that may be configured with the system 10. The user may then bring the products home in the reusable bags 100 and return the reusable bags 100 to any return location, have the reusable bags 100 picked up upon a future delivery, or in any other ways available through the system 10.

Computing

The applications, services, mechanisms, operations, and acts shown and described above are implemented, at least in part, by software running on one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 7:
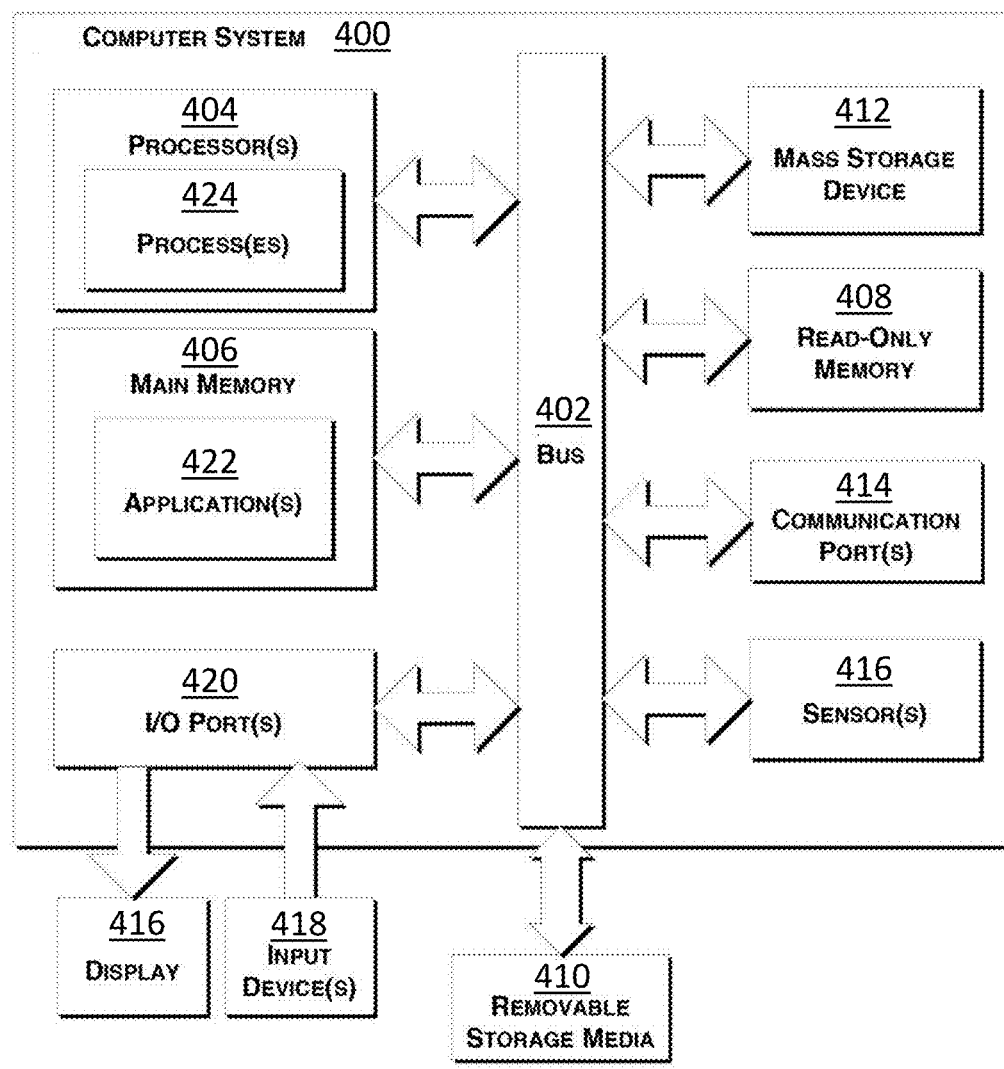
FIG. 7 depicts aspects of computing according to exemplary embodiments hereof.

FIG. 7 is a schematic diagram of a computer system 400 upon which embodiments of the present disclosure may be implemented and carried out.

According to the present example, the computer system 400 includes a bus 402 (i.e., interconnect), one or more processors 404, a main memory 406, read-only memory 408, removable storage media 410, mass storage 412, and one or more communications ports 414. Communication port(s) 414 may be connected to one or more networks (not shown) by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be any known processor, such as, but not limited to, an Intel® Itanium® or Itanium 2® processor(s), AMD® Opteron® or Athlon MP® processor(s), or Motorola® lines of processors, and the like. Communications port(s) 414 can be any of an Ethernet port, a Gigabit port using copper or fiber, or a USB port, and the like. Communications port(s) 414 may be chosen depending on a network such as a Local Area Network (LAN), a Wide Area Network (WAN), or any network to which the computer system 400 connects. The computer system 400 may be in communication with peripheral devices (e.g., display screen 416, input device(s) 418) via Input/Output (I/O) port 420.

Main memory 406 can be Random Access Memory (RAM), or any other dynamic storage device(s) commonly known in the art. Read-only memory (ROM) 408 can be any static storage device(s) such as Programmable Read-Only Memory (PROM) chips for storing static information such as instructions for processor(s) 404. Mass storage 412 can be used to store information and instructions. For example, hard disk drives, an optical disc, an array of disks such as Redundant Array of Independent Disks (RAID), or any other mass storage devices may be used.

Bus 402 communicatively couples processor(s) 404 with the other memory, storage and communications blocks. Bus 402 can be a PCI/PCI-X, SCSI, a Universal Serial Bus (USB) based system bus (or other) depending on the storage devices used, and the like. Removable storage media 410 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 406 is encoded with application(s) 422 that support(s) the functionality as discussed herein (the application(s) 422 may be an application(s) that provides some or all of the functionality of the services/mechanisms described herein, e.g., AR story application 232, FIG. 2A). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406 via the use of bus 402 in order to launch, run, execute, interpret or otherwise perform the logic instructions of the application(s) 422. Execution of application(s) 422 produces processing functionality of the service related to the application(s). In other words, the process(es) 424 represent one or more portions of the application(s) 422 performing within or upon the processor(s) 404 in the computer system 400.

It should be noted that, in addition to the process(es) 424 that carries(carry) out operations as discussed herein, other embodiments herein include the application 422 itself (i.e., the un-executed or non-performing logic instructions and/or data). The application 422 may be stored on a computer readable medium (e.g., a repository) such as a disk or in an optical medium. According to other embodiments, the application 422 can also be stored in a memory type system such as in firmware, read only memory (ROM), or, as in this example, as executable code within the main memory 406 (e.g., within Random Access Memory or RAM). For example, application(s) 422 may also be stored in removable storage media 410, read-only memory 408, and/or mass storage device 412.

Those skilled in the art will understand that the computer system 400 can include other processes and/or software and hardware components, such as an operating system that controls allocation and use of hardware resources. For example, as shown in FIG. 18, the computer system 400 may include one or more sensors 426.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Although embodiments hereof are described using an integrated device (e.g., a smartphone, a mobile device, etc.), those of ordinary skill in the art will appreciate and understand, upon reading this description, that the approaches described herein may be used on any computing device that includes a display and an interface. For example, the system may be integrated into a heads-up display of a car or the like.

As used herein, including in the claims, the phrase "at least some" means "one or more," and includes the case of only one. Thus, e.g., the phrase "at least some ABCs" means "one or more ABCs", and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

Thus is provided an augmented reality system that combines a live view of a real-world, physical environment with imagery based on live images from one or more other devices.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A system for providing reusable bags, the system comprising:
    a plurality of reusable bags each configured with an electronic tracking mechanism and including a closed bottom and an upper opening adapted to receive objects into the bag;
    at least one deployment station adapted to store the plurality of reusable bags and to dispense at least one of the plurality of reusable bags;
    an electronic sensing device configured with the at least one deployment station; and
    at least one locking mechanism configured with the deployment station;
    wherein the at least one locking mechanism locks the plurality of reusable bags to the at least one deployment station when locked, and releases the at least one of the plurality of reusable bags for dispensing by the at least one deployment station when unlocked; and
    wherein the electronic sensing device is configured such that, when the at least one of the plurality of reusable bags is dispensed by the at least one deployment station, the electronic sensing device senses the electronic tracking mechanism of the at least one of the plurality of reusable bags.

2. The system of claim 1 further comprising an electronic controller that locks and unlocks the at least one locking mechanism.

3. The system of claim 1 wherein the tracking mechanism is an RFID mechanism.

4. The system of claim 1 further comprising a control platform in communication with the at least one deployment station.

5. The system of claim 4 wherein the control platform receives information from the at least one deployment station regarding the removal of the reusable bags.

6. The system of claim 5 wherein the information includes user account information.

7. The system of claim 4 wherein the control platform communicates with a user device.

8. The system of claim 7 wherein the user device receives information from the control platform and/or sends information to the control platform.

9. The system of claim 1 further comprising at least one indicator configured with the at least one of the plurality of reusable bags, the indicator adapted to indicate visual information based on the date the at least one of the plurality of reusable bags was dispensed.

10. The system of claim 9 wherein the indicated visual information includes the due date for the at least one of the plurality of reusable bags to be returned to the system.

11. The system of claim 9 wherein the at least one indicator is electronic.

12. The system of claim 9 wherein the tracking mechanism of the at least one of the plurality of reusable bags provides information to the at least one indicator.

13. A method for providing reusable bags, the method comprising:
    (A) providing at least one deployment station adapted to store a plurality of reusable bags and to dispense at least one of the plurality of reusable bags;
    (B) configuring the at least one deployment station with at least one locking mechanism;
    (C) locking a plurality of reusable bags with the locking mechanism wherein each of the plurality of reusable bags includes an electronic tracking mechanism, a closed bottom and an upper opening adapted to receive objects into the bag;
    (D) configuring an electronic sensing device with the at least one deployment station such that, when the at least one of the plurality of reusable bags is dispensed by the at least one deployment station, the electronic sensing device senses the electronic tracking device of the at least one of the plurality of reusable bags;
    (E) dispensing the at least one of the plurality of reusable bags from the at least one deployment station by unlocking the locking mechanism; and
    (F) using the electronic sensing device to sense the tracking mechanism of the at least one of the plurality of reusable bags dispensed in step (E).

14. The method of claim 13 further comprising between steps (C) and (D):
    (C)(1) configuring the locking mechanism with an electronic controller that unlocks the locking mechanism to dispense the at least one of the plurality of reusable bags.

15. The method of claim 13 further comprising:
    (G) sending information based at least in part on the sensing in step (F) to a control platform.

16. The method of claim 15 further comprising:
    (H) sending information from a user device to the control platform.

17. The method of claim 15 further comprising:
    (I) sending information from the control platform to a user device.

18. A system for providing reusable bags, the system comprising:
    a plurality of reusable bags each configured with an electronic tracking mechanism and including a closed bottom and an upper opening adapted to receive objects into the bag;
    at least one deployment station including a storage area for storing the plurality of reusable bags and a dispensing area for dispensing at least one of the plurality of reusable bags;
    at least one locking mechanism configured with the deployment station; and an electronic sensing device configured with the at least one deployment station;

wherein the at least one locking mechanism locks the plurality of reusable bags to the at least one deployment station when locked, and releases the at least one of the plurality of reusable bags for its removal from the storage area when unlocked; and wherein the electronic sensing device is configured such that, when the at least one of the plurality of reusable bags is removed from the storage area and dispensed by the dispensing area, the electronic sensor senses the electronic tracking mechanism of the at least one of the plurality of reusable bags.

19. The system of claim 18 wherein the electronic sensing device senses the number of reusable bags dispensed from the at least one deployment station.

20. The system of claim 19 wherein the at least one deployment station sends information to a control platform based at least in part on the number of reusable bags dispensed.

* * * * *